United States Patent [19]

Schulien et al.

[11] 4,443,952

[45] Apr. 24, 1984

[54] GYROSCOPIC APPARATUS

[75] Inventors: Howard E. Schulien, Montville; Raymond M. Bendett; Michael J. Lanni, both of Ridgewood, all of N.J.

[73] Assignee: The Bendix Corporation, Teterboro, N.J.

[21] Appl. No.: 319,483

[22] Filed: Nov. 9, 1981

[51] Int. Cl.³ .................................. G01K 19/384
[52] U.S. Cl. .................................................. 33/324
[58] Field of Search .............................. 33/324–327; 74/5 R, 5.9, 5.8

[56] References Cited

U.S. PATENT DOCUMENTS

| | | | |
|---|---|---|---|
| 3,254,419 | 6/1966 | Hurlburt | 33/326 |
| 3,394,596 | 7/1968 | Wehde et al. | 33/324 X |
| 4,158,261 | 6/1979 | Aver | 33/324 |

Primary Examiner—Harry N. Haroian
Attorney, Agent, or Firm—Anthony F. Cuoco; Thomas L. Adams

[57] ABSTRACT

Apparatus is operable gyroscopically to determine direction and to determine north. This apparatus includes a case (34), a gimbal (20) and a central gyro (10). The gimbal (20) is rotatably mounted in the case for rotating azimuthally. The central gyro (10) has transverse to its spin axis (16), a single degree of rotational freedom. This central gyro (10) is mounted in the gimbal (20) to rotate about its spin axis (16) and shift the degree of freedom between a vertical (12) and a horizontal (18) axis. The central gyro (10) has a transducer (28) and a torquer (26). The transducer (28) can sense motion about the single degree of freedom and can provide a deflection signal signifying this motion. The torquer (26) is connected to the transducer (28) and can respond to its deflection signal for applying a torque to the central gyro (10) tending to affect motion about the single degree of freedom, when this freedom is oriented along the vertical axis (12). The apparatus may be used to determine north when the single degree of freedom is vertical. The torque required to restrain motion about this degree of freedom can be measured. Thereafter, the spin axis (16) can be rotated azimuthally by 90 degrees and the torque required to restrain motion about the degree of freedom remeasured. The north to south direction is estimated by applying the torque measured before and after the 90 degrees of azimuthal rotation to a predetermined trigonometric formula.

26 Claims, 4 Drawing Figures

GYROSCOPIC APPARATUS

BACKGROUND OF THE INVENTION

The present invention relates to gyrocompasses and, in particular, to methods for accurately determining north and direction.

It is known to use a gyroscope to determine north by sensing the rotation of the earth. A gyroscope having a horizontal spin axis responds to the horizontal component of the angular rate of rotation of the earth by producing a torque on the gyroscope tending to align its spin axis with that of the earth.

It is also known to use a gyroscope having a single degree of freedom so that only the horizontal component of the earth's rotation is influential. This degree of freedom is about a vertical axis. Since the torque produced by the rotation of the earth is rather small, known gyrocompasses employ an air bearing to substantially eliminate resisting torques.

It is also known to rotate the input axis of a dualfunction gyroscope 90° and thereby shift its degree of freedom from a horizontal to a vertical axis, for example, U.S. Pat. No. 3,254,419. This 90° rotation shifts the operation from directional to north seeking. A gyroscope of the latter type, however, does not employ a torquer to affect motion about the single degree of freedom of the gyroscope. Also in gyrocompasses of this type, the large amounts of azimuthal rotation required to swing the gyroscope towards north is accomplished by a servo which supports a pitch and roll gimbal. Consequently, the azimuthal motor is required to carry two additional gimbals mechanisms as well as the central gyroscope.

A similar, known gyroscope (U.S. Pat. No. 3,394,596) is so mounted within an azimuthally rotatable gimbal that the degree of rotational freedom of the gyroscope can also be shifted from a horizontal to a vertical axis. Again, this type of dual-function gyroscope does not employ a torquer to restrain motion about the single degree of freedom of the gyroscope. Accordingly, this gyroscope does not measure the horizontal component of the rate of angular rotation of the earth transverse to the spin axis of the gyroscope (north seeking mode). Consequently, this type of gyroscope is unable to estimate the extent to which its spin axis is misaligned with respect to north. Also, this known gyroscopic device employs a follow-up means which operates only in the north seeking mode. The follow-up is mechanically disengaged when the gyro is swung into its directional position. Such mechanical disengagement complicates the gyroscope and tends to unbalance the central gyro by necessitating a motor or a pinion nonconcentrically mounted within the device.

Accordingly, there is a need for a gyroscopic system which can accurately determine north and avoids the errors of the systems of the prior art. There is also a need for a gyrocompass that can be shifted to operate in a directional mode.

SUMMARY OF THE INVENTION

In accordance with the illustrative embodiments demonstrating features and advantages of the present invention, there is provided apparatus operable gyroscopically to determine direction and to determine north. The apparatus includes a case, gimbal means and a central gyro. The gimbal means is rotatably mounted in the case for rotating azimuthally. The central gyro has transverse to its spin axis a single degree of rotational freedom. This central gyro is rotatably mounted in the gimbal means for rotation about the spin axis to shift the degree of freedom between a vertical and a horizontal axis. The central gyro also includes a transducer means and a torque means. The transducer means can sense motion about the single degree of freedom and can provide a deflection signal signifying such motion. The torque means is connected to the transducer means and can respond to its deflection signal and can apply a torque to the central gyro tending to affect motion about the single degree of freedom when this freedom is oriented along the vertical axis.

A related method according to the teachings of the present invention can determine north with a gyroscope. This gyroscope has transverse to its spin axis, a single degree of freedom. The method includes the step of orienting the gyroscope with its single degree of freedom vertical. Another step is measuring the torque required to restrain motion about the degree of freedom. The method also includes the step of azimuthally rotating the spin axis by 90 degrees and remeasuring the torque required to restrain motion about the degree of freedom. Also included is the step of estimating the north to south direction by applying the torques measured before and after the 90 degrees of rotation to a predetermined trigonometric formula.

An associated method according to the teachings of the present invention includes the steps of orienting the gyroscope with its single degree of freedom vertical and measuring the torque required to restrain motion about the degree of freedom. The method further includes the step of azimuthally rotating the spin axis into an estimated northerly direction bearing a predetermined relation to the measured torque about the degree of freedom and remeasuring the torque required to restrain motion about the degree of freedom at said estimated northerly direction. The method also includes the step of applying the torque measured in the estimated northerly direction to a predetermined formula to determine north without rotating the spin axis.

The foregoing methods may be accomplished with apparatus according to the teachings of the present invention which operates gyroscopically to determine north. This apparatus includes a gimbal means rotatably mounted within a case for rotating azimuthally as well as a control means for driving the gimbal means. A central gyro is included and it has transverse to its spin axis, a single degree of rotational freedom. The gyro has a transducer means for sensing motion about the single degree of freedom and for providing a deflection signal signifying this motion. The gyro also has a torque means connected to the transducer means. The torque means can respond to the deflection signal and apply a torque to the central gyro tending to affect motion about the single degree of freedom. The control means can operate to successively drive the gimbal means to two orthogonal positions. The control means is connected to the torque means and can operate to feed back from the transducer means to the torque means, a rate signal sized to restrict motion about the single degree of freedom. This rate signal bears a predetermined relationship to the horizontal component of the angular rate of rotation of the earth transverse to the spin axis of the gyro. This control means can provide a compass signal bearing a predetermined trigonometric relation to the two values of the rate signal when the gimbal means is in the two orthogonal positions. This compass signal is an estimate of the north to south direction.

Preferably, the central gyro is mounted in an azimuthal gimbal which is, in turn, supported within roll and pitch gimbals. The pitch and roll gimbals are driven by torquers so that the azimuthal gimbal is kept erect and can rotate about a vertical axis. If a "brute force" method of erection is used (high angular momentum wheel), level sensors drive torquers to provide a torque to an associated gimbal (roll or pitch) when motion is desired about the other gimbal. Preferably, however, a pair of single degree of freedom gyros are mounted on a middle gimbal for stabilization and isolation of the central gyro from base motion. These gyros separately cooperate with individual level sensors which apply an input torque along the degree of freedom of each gyro. Each gyro output is from a transducer which senses motion about the single degree of freedom and applies a feedback signal to a torquer on the pitch or roll gimbal tending to erect that gimbal. This combination of elements is known as a stabilization servo.

In a preferred embodiment, the control means is a computer which receives as its inputs the signal from the transducer measuring displacement about the single degree of freedom of the central gyro. The computer can also azimuthally rotate the central gyro by rotating the azimuthal gimbal for both the gyrocompass and directional mode. Preferably, the spin axis of the central gyro is aligned very closely to the horizontal component of the angular rate of rotation of the earth but no attempt is made to make the alignment exact. Instead, the gyroscope operating as a rate sensor, measures the offset of the gyro from true north. This offset is stored in the computer as a correction factor. This feature is significant since it avoids applying disturbances to a sensitive gyro when it is measuring extremely small angular rates. If such disturbances were applied, the resulting effects would overwhelm the small measurement in progress, necessitating large settling times and significant errors.

In the preferred embodiment, north is estimated by taking two measurements of the earth's angular rate of rotation with the spin axis at two horizontal positions spaced by 90°. The ratio and polarities of these measurements are applied to an arctangent formula to estimate north. Thereafter, the spin axis is rotated to an estimated south direction to start the procedure for estimating bias. Once the measurement in the southerly position is made, the data is updated and the gyrocompass rotated to the best estimate of north. At this point, the rates at both the south and north positions and the associated azimuthal gimbal readings are used to calculate the offset of the spin axis from north and the bias error.

Preferably, the above measurements of small angular rates are made repetitively by a computer and then averaged to eliminate, as far as possible, noise. Also, the gyro can be subsequently turned to a gyrocompass mode and quickly realigned using abbreviated procedures.

BRIEF DESCRIPTION OF THE DRAWINGS

The above brief description as well as other objects, features and advantages of the present invention will be more fully appriciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENT

Figure 1:
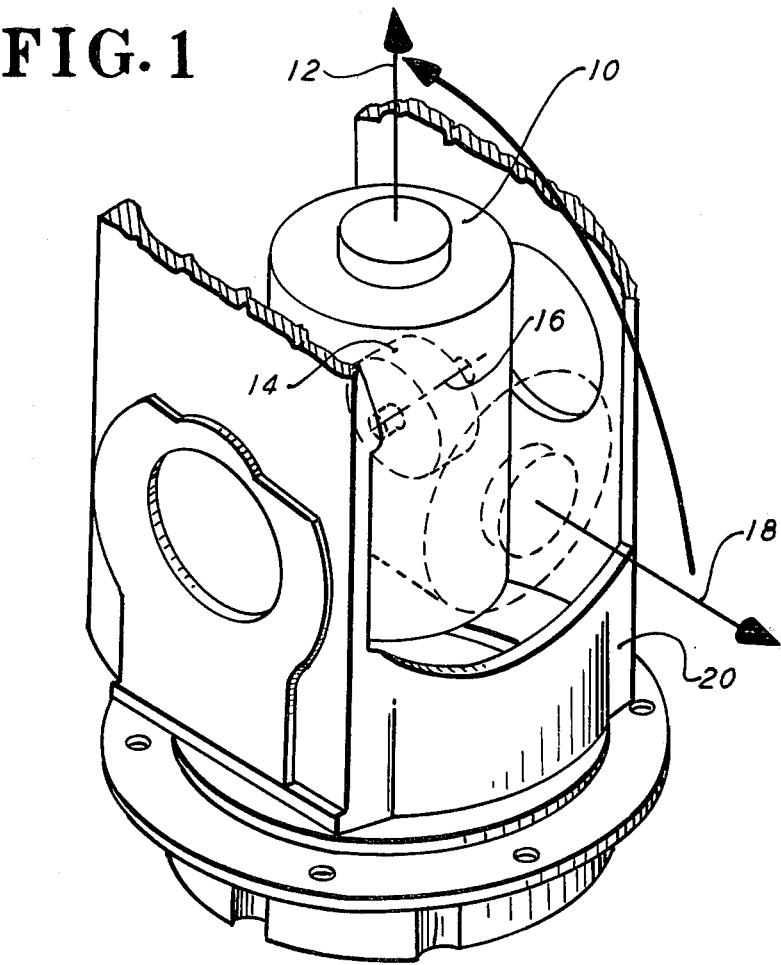
FIG. 1 is a partial perspective view of a central gyro and gimbal means according to the teachings of the present invention.

Referring to FIG. 1, a central gyro 10 is shown with its single degree of freedom aligned to vertical axis 12. Gyro 10 includes a spinning element 14 having a horizontal spin axis 16 which is transverse to vertical axis 12. As is well understood in the art, rotation of the case of gyro 10 about horizontal axis 18, tends to cause torque on its float and consequent float motion about the single degree of freedom of gyro 10 (about vertical axis 12). This axis is usually called the output axis (OA) of the gyro. In this embodiment, gyro 10 has an internal fluid bearing which allows spin axis 16 to rotate azimuthally. Such asimuthal rotation can be measured by internal transducer means (schematically illustrated hereinafter) which may be an electromagnetic device having a null position but producing an offset signal when the spin axis is rotated away from this null position. Gyro 10 also includes a torque means (schematically illustrated hereinafter) operable to apply a torque tending to azimuthally drive spin axis 16 in a direction determined by the electrical drive applied to this torque means. Such devices are known in the art as torquers and are described further hereinafter.

Central gyro 10 is mounted in a gimbal means shown herein as gimbal frame 20. Gyro 10 is rotatably mounted within gimbal 20 so that the gyro may rotate from the position shown in full to the position shown in phantom. Such rotation brings the single degree of freedom of gyro 10 from the illustrated vertical position 12 to the horizontal position 18. This essentially changes the input axis of gyro 10 from a horizontal to a vertical orientation.

Figure 2:
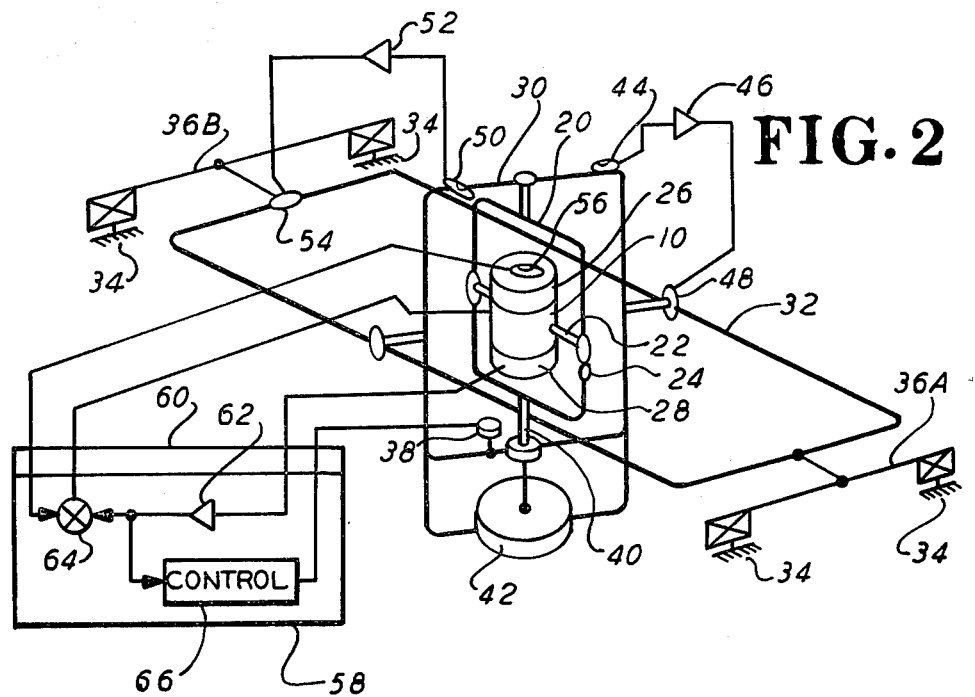
FIG. 2 is a schematic representation of apparatus according to the principles of the present invention, employing the equipment of FIG. 1.

Referring to FIG. 2, previoulsy mentioned gimbal 20 is illustrated schematically as supporting gyro 10 about horizontal axle 22. Motor 24 is shown connected to axle 22 to drive gyro 10 from the position shown (single degree of freedom vertical) by 90 degrees so that the degree of freedom is then horizontal. Central gyro 10 is schematically illustrated as being partitioned into the previously mentioned torque means 26 and the previously mentioned transducer means 28. Gimbal 20 is shown mounted by vertical shafts onto pitch gimbal 30. Pitch gimbal 30 is rotatably mounted about a horizontal axis within roll gimbal 32. Roll gimbal 32 is rotatably mounted to case 34. The shock absorbing devices 36A and 36B are optional. As illustrated, gimbal 32 can rotate about an axis which is orthogonal to the axis of rotation of gimbal 30. Mounted on gimbal 30, is an azimuthal drive means, shown herein as motor 38 which is mechanically coupled to shaft 40 to rotate gimbal 20 azimuthally.

In this embodiment, gimbals 30 and 20 are kept erect by a brute force method employing spinning wheel 42, having a relatively high angular momentum. To this end, level sensor 44 is mounted on gimbal 30 and senses rolling motions from true vertical to apply through feedback amplifier 46 a signal which causes torquer 48 to apply a torque to the pitch axis (axle supporting pitch gimbal 30). For well understood reasons, spinning wheel 42 produces rotation along an orthogonal axis (axle supporting roll gimbal 32) tending to erect and stabilize gimbal 20. Similarly, level sensor 50 senses pitching motion away from vertical to feedback through amplifier 52 a signal tending to cause torquer 54 to apply a correcting torque about the roll axis (axle supporting roll gimbal 32). Again for well understood reasons, spinning wheel 42 produces an erecting and stabilizing motion about the orthogonal pitch axis (axle supporting pitch gimbal 30).

Level sensor 56 is shown mounted atop gyro 10 to sense deviation of the gyro from vertical. This latter sensor is an optional cross check of the other level sensors. Sensor 56 is connected to a control means shown schematically herein as block 58. Preferably, control means 58 is a computer having memory and employing digital to analog and analog to digital converter 60. The interior of block 60 is shown schematically incorporating certain circuitry. It will be understood, however, that this illustrated circuitry is only suggestive of the type of functions performed by computer 58. The output of transducer 28 is connected to the input of amplifier 62, whose output connects to the input of control device 66 and to one input of summing circuit 64. Summing device 64 has its other input connected to level sensor 56, and its output connected to torquer 26.

Control device 66 has an output connected to azimuthal drive motor 38 for driving it. Computer 58 is programmed to apply signals to torquer 26 and drive motor 38 to perform the sequence of operations described hereinafter. It will be understood, however, that while a computer is preferred, it may be replaced by other circuitry similar to that schematically illustrated herein. In that case, conventional feedback circuitry may be employed to produce the effects described subsequently and capacitive or other forms of memory may be used, if required.

Figure 3:
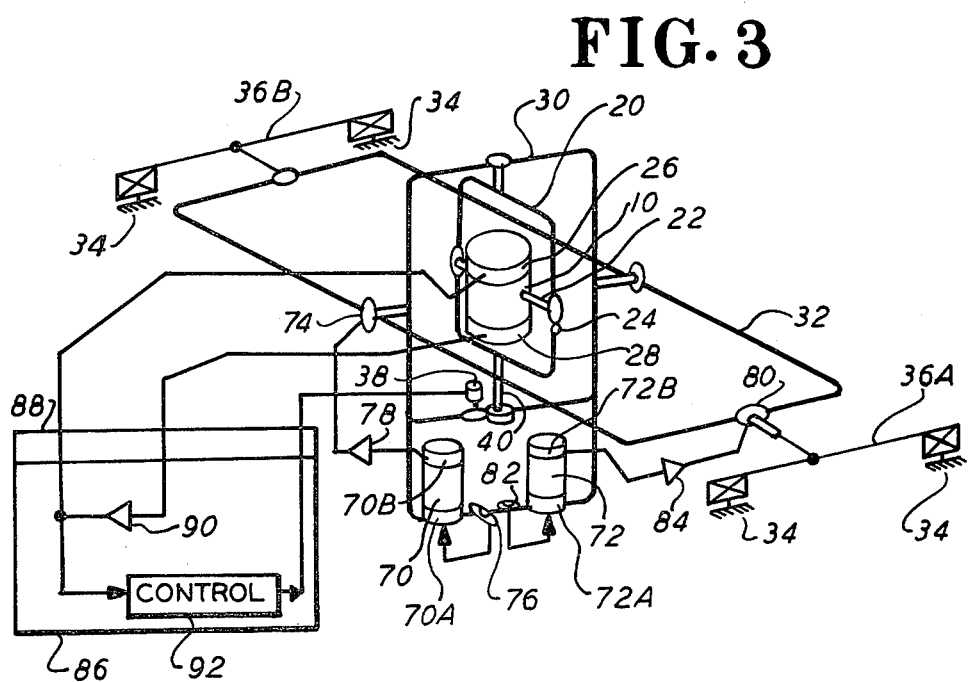
FIG. 3 is a schematic representation of an embodiment of the present invention which is an alternate of that of FIG. 2.

Referring to FIG. 3, an illustrated, alternate embodiment bears the same reference numerals for components which are the same as in FIG. 2. In the embodiment of FIG. 3, instead of a "brute force" approach, the previously mentioned high angular momentum wheel is replaced by a pair of gyroscopes 70 and 72, each having a single degree of freedom. Gyroscope 70 has a torquer 70A and a transducer 70B operating about the degree of freedom in a manner similar to that described for central gyro 10. Similarly, gyro 72 has operating about its degree of freedom a torquer 72A and a transducer 72B. The input axis of gyroscope 70 is parallel to the pitch axis, motion about this pitch axis being controlled by torquer 74. Errors from vertical about the pitch axis are sensed by level sensor 76 which applies a torque to torquer 70A tending to produce a compensating output from transducer 70B which when coupled through feedback amplifier 78, apples a signal to torquer 74 to erect pitch gimbal 30. The input axis of gyroscope 72 is orthogonal to the input axis of gyroscope 70 and the azimuthal axis 40. Consequently, when the pitch gimbal 30 as controlled by torquer 74 is approximately erect, then the input axis of gyroscope 72 is approximately parallel to the roll axis. The roll gimbal is rotated by roll torquer 80. Roll level sensor 82 senses deviations in roll from vertical to apply a torque through torquer 72A to gyroscope 72. This produces a correction signal through transducer 72B which when fed back through amplifier 84, produces a torque from torquer 80 tending to erect gimbal 32 so that central gyro 10 is corrected for deviations in roll from vertical. It will be appreciated that gyroscopes 70 and 72 are therefore corrected on a long term basis by level sensors 76 and 82, respectively. High speed corrections, however, can be made by gyroscopic error signal produced directly by gyroscopes 70 and 72.

A control means is again shown herein as a computer 86 having a digital to analog and analog to digital converter 88. Structurally, computer 86 may be the same as the previously described computer (computer 58 of FIG. 2). However, computer 86 may be programmed to operate and function differently. This different function is suggested by apparent amplifier 90, whose input connects to transducer 28 and whose output connects to torquer 26. The output of amplifier 90 is connected to the input of control device 92, whose output drives azimuthal drive motor 38.

In order to facilitate an understanding of the principles associated with the foregoing apparatus, its operation will be briefly described. The operation of the apparatus of FIG. 2 is similar to that of FIG. 3, except an additional correction signal is provided from level sensor 56 (FIG. 2) to computer 58 to correct for unexpected errors in the positioning caused by motor 24 or errors due to misalignment from horizontal of the input axis of gyro 10 when both bubble sensor 50 and 44 are at a null. As previously mentioned, level sensor 56 is optional. Also, the operation of the apparatus of FIG. 2 differs in that gimbal 20 is erected and stabilized by a "brute force" method using the level sensors, feedback devices and torquers previously described. Therefore, the operation of the apparatus of FIG. 3 will be specifically described, it being understood that the operation of the apparatus of FIG. 2 is similar except as just noted. In the following description, it will be assumed that gyroscopes 70 and 72 are operating normally so that gimbal 20 is erect and the axle 40 is kept vertical. Such erection is facilitated by optional shock absorbing system 36A and 36B which filter vibrations of a frequency that may be too high to be corrected by gyros 70 and 72.

Figure 4:
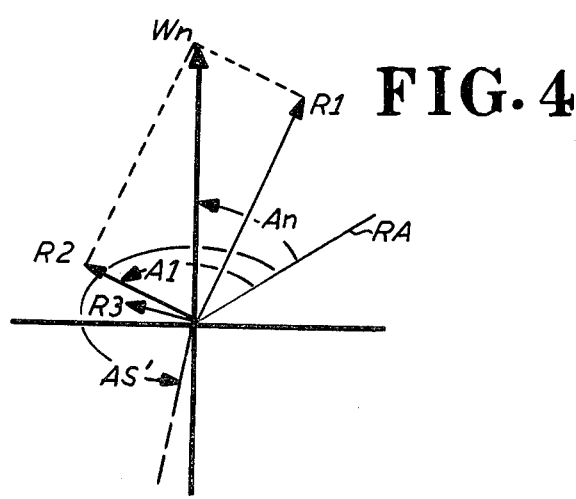
FIG. 4 is a diagram of vectors, in a horizontal plane, associated with the apparatus of FIGS. 1-3.

Initially, gyroscope 10 is oriented as shown with its single degree of freedom (output axis) vertical. The spin axis is then horizontal and approximately aligned with the axle 22. For well understood reasons, the input axis of gyroscope 10 is transverse to its spin axis and therefore horizontal. Unless the spin axis is by chance aligned with the horizontal component of the angular rate of rotation of the earth, the earth's rotation will tend to apply a torque about the degree of freedom of gyroscope 10, therefore causing a deflection signal from transducer 28. The feedback mechanism 90 produces a compensating signal which when applied to torquer 26 balances the torque caused by the rotation of the earth. The loop gain is such that very little rotation is permitted about the degree of freedom of gyroscope 10. Consequently, gyroscope 10 acts as a rate sensor producing an output from feedback amplifier 90 that is a measure of the horizontal component of the angular rotation of the earth. This initial measurement is considered the first reading of gyroscope 10 in its gyrocompass mode. As shown in FIG. 4, the horizontal component of the angular rate of rotation of the earth is illustrated as the vector Wn. The input axis of gyroscope 10 is initially oriented along vector R1, thereby measuring a component R1 of the earth's angular rate of rotation. Of course, the spin axis of gyro 10 is orthogonal to the input axis reading R1 and is oriented along the direction of vector R2. Angular positions of gyroscope 10 are defined herein as the angle between the gyroscope spin axis and horizontal projection of the roll axis RA. Therefore, the position of gyroscope 10 for reading R1 is defined as angle A1. The orientation of earth rate vector Wn (the angle to be measured) is illustrated herein as angle An, the angle between the horizontal projection of the roll axis (RA) and vector Wn. The value of measurement R1 may be defined as follows:

$$R1 = Wn \sin(A1-An') \tag{1}$$

wherein quantity An' is an estimate of angle An (it is only an estimate since certain biasing errors need to be taken into account). It will be noted that for the condition shown in FIG. 4, for this first reading, the rate signal measurement R1 is a positive quantity. This quantity R1 is sensed by control device 92 (FIG. 3) and its polarity noted. Control device 92 next commands azimuthal drive motor 38 to rotate gimbal 20 by 90° exactly. The direction in which rotation occurs depends upon the polarity of rate signal R1. When rate signal R1 is positive and negative gimbal 20 is rotated counterclockwise and clockwise, respectively (when viewed from above). Accordingly, the input axis of gyroscope 10 is now oriented as shown by vector R2 (FIG. 4). Vector R2 represents the component of earth vector Wn now measured by gyroscope 10 after being asimuthally rotated 90° (positive value for vector R2). Since gyroscope 10 was rotated counterclockwise, its spin axis is now antipodal to vector R1. Consequently, the value of the second rate reading R2 may be expressed as follows:

$$R2 = +Wn \sin[A1 + \pi/2 \text{ sine}(R1) - An'] \tag{2}$$

$$= Wn \cos(A1 - An') \text{ sine}(R1) \tag{3}$$

the function "sign" is equal to plus one when the value of its independent variable R1 is positive or zero, otherwise this function equals minus one. Equations 1 and 3 above can be solved for the estimated angle to north An' according to the following formula:

$$An' = A1 + \arctan\left(\frac{-R1}{R2 \text{ sine } R1}\right) \tag{4}$$

wherein the arctangent function is sensitive to the sign of the numerator and denominator to determine in which of the four quadrants angle An' is located. This expression then provides an estimate of where approximately north is oriented. Azimuthal motor 38 (FIG. 3) now operates to drive gimbal 20 to an antipodal position, that is, 180° away from the angular estimate of north An'. This third position is defined as angle As' and equals An' plus 180°. Accordingly, the value of the third rate reading R3 may be defined as follows:

$$R3 = B + Wn \sin(An'' - As' + \pi) \tag{5}$$

$$= B + Wn(An'' - As' + \pi) \tag{6}$$

wherein B is a bias term and angle An" is a second estimate of angle An. The second approximate expression (equation 6) relies on the fact that the parenthetical term is almost zero degrees. Angle An" is still an estimate, since it will still need a final correction when gyroscope 10 is rotated into its final position as described hereinafter. Equation 6 has two independent variables and cannot be solved by itself (An" and B). Consequently, gyroscope 10 is again azimuthally rotated to bring its spin axis into an estimated northerly orientation. This northerly orientation is estimated from equation 6, a measurement performed with the spin axis almost pointing south, by setting bias term B equal to zero. Then by rearranging equation 6:

$$An'' = R3/Wn + As' - \pi \tag{7}$$

The value of angle An" is the best present estimate of north and therefore the gimbal 20 is rotated to this angle. In this fourth position, the fourth rate reading R4 can be expressed as follows:

$$R4 = B - Wn \sin(An - An'') \tag{8}$$

$$= B - Wn(An - An'') \tag{9}$$

The linear expression 9 replaces the sine function 8 since its argument is almost zero. Alternatively, if the argument (here and in equation 5) is substantial, the solution can be more exactly obtained by computing the arcsin. It will be seen that if equation 6 is modified by replacing angle An" with angle An, these equations 6 and 9 can be solved for the variable angle An. These two linear equations can be solved for the final estimate An as follows:

$$An = \frac{R3 - R4}{2Wn} + \frac{As' - \pi + An''}{2} \tag{10}$$

The above equation may be rearranged as follows:

$$An = \frac{1}{2}(R3/Wn + As' - \pi) - (R4/2Wn) + \frac{1}{2}An'' \tag{11}$$

It will be noted that the first parenthetical term in equation 11 can be simplified by using equation 7 (eliminating R3) to produce the following expressions:

$$An = An'' - (R4/2Wn) \tag{12}$$

$$\text{error} = An'' - An = R4/2Wn \tag{13}$$

wherein the error is defined as the deviation of gimbal 20 from true north, that is, angle An. Thus, gimbal 20 has now been moved into an approximately northerly orientation and its deviation from true north can be calculated from equation 13 in a simple manner.

The bias B may be found by adding equation 6 and 9 and using equation 7 again to eliminate R3; thus:

$$B = R4/2 \tag{14}$$

This bias is used later in a realign mode to speed up the north-seeking mode.

Accordingly, now that the spin axis of gyroscope 10 has been given a known orientation very close to north, north has been measured. Gyroscope 10 may now be transferred into a directional mode. In contrast to the gyrocompass mode, the vehicle in which the gyro is mounted may move. To effect the directional mode, computer 86 energizes motor 24 causing the degree of freedom of gyroscope 10 to move from a vertical to a horizontal axis as shown in FIG. 1. During this rotation, the various gimbals may be blocked so that they do not change their presently desired orientation. Once the input axis of gyroscope 10 has been thus shifted to a vertical orientation, gyroscope 10 becomes sensitive to azimuthal changes of gimbal 20. Basically, the system will now operate to keep gimbal 20 (FIG. 3) at the same azimuthal orientation with respect to an inertial system, even though the vehicle may move underneath gimbal 20, as follows:

Initially, computer 86 acts to eliminate the feedback function represented by amplifier 90 so that feedback torque is no longer produced by torquer 26. Torquer 26 precesses gyro 10 at the vertical component of earth's rate. Instead, any change in the deflection signal from transducer 28 is sensed by control device 92 and interpreted as the integral of an undesired azimuthal shifting of the spin axis of gyroscope 10 from the present angle An". In response, control device 92 feeds back a correcting signal to azimuthal drive motor 38 which rotates gimbal 20 in such a direction that the deflection signal produced by transducer 28 is restored to its original value. Note that although the spin axis is not kept at true north, the computer has remembered the error (equation 13) and corrects therefor. A transducer (resolver) sends the azimuth gimbal angle, between gimbal 20 and gimbal 30, to computer 86 which subtracts the error (equation 13) and sends out the vehicle heading at a required sample rate. Similarly, a transducer sends the elevation gimbal angle, between gimbal 30 and gimbal 32 to computer 86 which transmits it at a required sample rate. Similarly, a roll transducer sends out the roll gimbal angle between gimbal 32 and case 34.

The realign mode consists of stopping the vehicle (supporting the case) and re-determining north rapidly. Gyroscope 10 is transferred to a north finding mode; the azimuth gimbal is moved through a small angle equal to the negative of the error of equation 13. A rate reading Rr is then taken of the horizontal component of earth's rate for an azimuth gimbal angle Ar. Similar to previous equations, with An the realign estimate of north, $$Rr = B + Wn \sin (Ar - An) \qquad (15)$$

$$Rr = B + Wn (Ar - An) \qquad (16)$$

$$\text{error} = Ar - An = (Rr - B)/Wn \qquad (17)$$

Gyroscope 10 is then transferred to a directional mode as before and the computer 86 transmits the corrected heading at the required sample rate.

Another optional procedure is estimating the inherent drift on the gyro when the vehicle is stationary. This procedure is initiated either by a signal from an operator or in response to changes in the transducer (resolvers) monitoring the various gimbals that are so small and slow as to indicate a stopped vehicle. In response, the computer 86 can monitor the rate at which gyro 10 drifts, storing that number away for subsequent use. This drift estimate is subsequently used to offset the gyro heading measurements to account for drift over the elapsed interval.

It is to be appreciated that various modifications may be implemented with respect to the above described preferred embodiments. While north is found in the above embodiment by a four step process, in other embodiments more or fewer steps may be employed, depending upon the accuracy required. Also, the disclosed computers may perform various functions and subroutines in a different order, depending upon the system requirements. Furthermore, the various torquers, motors and transducers mentioned herein may be of varying types depending upon the desired accuracy, speed, power, mass, etc. While various types of bearings are mentioned herein, it is to be appreciated that the bearing type may be changed depending upon the specific application. Also, while the gimbals disclosed herein have a specific shape, this shape may be altered depending upon the available volume or other design considerations. Moreover, in embodiments where a directional mode is not required, the equipment used to rotate the gyro upon its spin axis by 90° may be eliminated. In addition, the various components may be formed of appropriate materials to achieve the desired strength, weight, mass, speed, temperature stability, etc.

Obviously, many modifications and variations of the present invention are possible in light of the above teachings. It is therefore to be understood that within the scope of the appended claims, the invention may be practiced otherwise than as specifically described.

What is claimed is:

1. Apparatus operable gyroscopically to determine direction and to determine north, comprising:
   a case;
   gimbal means rotatably mounted in said case for rotating azimuthally; and
   a central gyro having transverse to its spin axis a single degree of rotational freedom, said central gyro being rotatably mounted in said gimbal means for rotation about said spin axis to shift said degree of freedom between a vertical and a horizontal axis, said central gyro including:
   transducer means for sensing motion about said single degree of freedom and for providing a deflection signal signifying said motion; and
   torque means connected to said transducer means and responsive to its deflection signal for applying a torque to said central gyro tending to affect motion about said single degree of freedom when said single degree of freedom is oriented along said vertical axis.

2. Apparatus according to claim 1 further comprising:
   azimuthal drive means connected to said transducer means for rotating said gimbal means in response to said deflection signal when said single degree of freedom is oriented along said vertical and horizontal axis.

3. Apparatus according to claim 2 further comprising:
   control means connected between said transducer means and said azimuthal means for driving the latter in response to said deflection signal, said control means being operable when said degree of freedom is horizontally oriented to drive said azimuthal drive means in a direction to cause gyroscopically motion about said degree of freedom tending to maintain said spin axis at a predetermined orientation.

4. Apparatus according to claim 3 wherein said control means is connected to said torque means and is operable when said degree of freedom is vertically oriented to feedback from said transducer means to said torque means a rate signal sized to restrict motion about said degree of freedom, said rate signal bearing a predetermined relationship to the horizontal component of the angular rate of rotation of the earth transverse to said spin axis.

5. Apparatus according to claim 4 further comprising:

a pair of gimbals for rotating said central gyro about two, horizontal, orthogonal axes;

a pair of gyroscopes each having a single degree of rotational freedom about a vertical axis and each having a spin axis orthogonal to the other; and a pair of torquers driven by said gyroscopes to cause said gimbals to keep said gimbal means erect and stable.

6. Apparatus according to claim 2 wherein said control means is operable through said azimuthal drive means to successively drive said gimbal means to two orthogonal positions when said degree of freedom is vertically oriented.

7. Apparatus according to claim 6 further comprising: control means connected to said torque means and operable when said degree of freedom is vertically oriented to feedback from said transducer means to said torque means a rate signal sized to restrict motion about said degree of freedom, said rate signal bearing a predetermined relationship to the horizontal component of the angular rate of rotation of the earth transverse to said spin axis, said control means being operable to provide a compass signal bearing a predetermined trigonometric relation to the two values of said rate signal when said gimbal means is in said two orthogonal positions, said compass signal being an estimate of the north to south direction.

8. Apparatus according to claim 7 wherein said control means is operable to drive said gimbal means to cause an approximate antipodal alignment of said spin axis with the horizontal component of the angular rate of rotation of the earth in response to said compass signal.

9. Apparatus according to claim 8 wherein said control means is operable to rotate said gimbal means from said approximate antipodal alignment by a calculated angle differing from 180° by an amount bearing a predetermined functional relationship to the value of said rate signal during said antipodal alignment.

10. Apparatus according to claim 9 wherein said control means is operable to produce a north signal signifying the offset of said spin axis from north after rotation through said calculated angle, said offset bearing a given relationship to the value of said rate signal after rotation through said calculated angle.

11. Apparatus according to claim 7 wherein said compass signal is a trigonometric function of the ratio of the two values of said rate signal when said gimbal means is in said two orthogonal positions.

12. Apparatus according to claim 11 wherein said trigonometric function includes an arctangent function.

13. Apparatus according to claim 6 wherein the direction of the second reached one of the two orthogonal positions with respect to the first reached one is determined by the polarity of said rate signal when said gimbal means is in the first reached one of the two positions.

14. Apparatus operable gyroscopically to determine north, comprising:

a case;

gimbal means rotatably mounted in said case for rotating azimuthally;

control means for driving said gimbal means; and a central gyro having transverse to its spin axis a single degree of rotational freedom, said central gyro being mounted in said gimbal means and including:

transducer means for sensing motion about said single degree of freedom and for providing a deflection signal signifying said motion; and torque means connected to said transducer means and responsive to its deflection signal for applying a torque to said central gyro tending to affect motion about said single degree of freedom, said control means being operable to successively drive said gimbal means to two orthogonal positions, said control means being connected to said torque means and being operable to feedback from said transducer means to said torque means a rate signal sized to restrict motion about said degree of freedom, said rate signal bearing a predetermined relationship to the horizontal component of the angular rate of rotation of the earth transverse to said spin axis, said control means being operable to provide a compass signal bearing a predetermined trigonometric relation to the two values of said rate signal when said gimbal means is in said two orthogonal positions, said compass signal being an estimate of the north to south direction.

15. Apparatus according to claim 14 wherein said control means is operable to drive said gimbal means to cause an approximate antipodal alignment of said spin axis with the horizontal component of the angular rate of rotation of the earth in response to said compass signal.

16. Apparatus according to claim 15 wherein said control means is operable to rotate said gimbal means from said approximate antipodal alignment by a calculated angle differing from 180° by an amount bearing a predetermined functional relationship to the value of said rate signal during said antipodal alignment.

17. A method for determining north with a gyroscope having transverse to its spin axis a single degree of freedom, comprising the steps of:

orienting said gyroscope with its single degree of freedom vertical;

measuring the torque required to restrain motion about said degree of freedom;

azimuthally rotating said spin axis by 90°, remeasuring the torque required to restrain motion about said degree of freedom; and estimating the north to south direction by applying the torques measured before and after said 90° of rotation to a predetermined trigonometric formula.

18. A method according to claim 17 further comprising the step of:

azimuthally rotating said spin axis into an approximate antipodal alignment with the horizontal component of the angular rate of rotation of the earth in accordance with said predetermined trigonometric formula.

19. A method according to claim 18 further comprising the step of:

azimuthally rotating said spin axis from said antipodal alignment by a calculated angle differing from 180° by an amount bearing a predetermined functional relationship to the torque required to restrain motion about said degree of freedom when said spin axis was in said approximate antipodal alignment.

20. A method according to claim 19 further comprising the step of:

rotating the axis of said single degree of freedom from a vertical to a horizontal orientation; and sensing motion about said degree of freedom as an indication of azimuthal changes in the direction of said spin axis.

21. A method for gyroscopically determining direction and north with a gyroscope having transverse to its spin axis a single degree of freedom, comprising the steps of:

orienting said gyroscope with its single degree of freedom vertical;

measuring the torque required to restrain motion about said degree of freedom;

azimuthally rotating said spin axis into approximate aligment with the horizontal component of the rate of rotation of the earth as a function of the measured torque about said degree of freedom;

rotating the axis of said single degree of freedom from a vertical to a horizontal orientation; and sensing motion about said degree of freedom as an indication of azimuthal changes in the direction of said spin axis.

22. A method for determining north with a gyroscope having transverse to its spin axis a single degree of freedom, comprising the steps of:

orienting said gyroscope with its single degree of freedom vertical;

measuring the torque required to restrain motion about said degree of freedom;

azimuthally rotating said spin axis into an estimated northerly direction bearing a predetermined relation to the measured torque about said degree of freedom;

remeasuring the torque required to restrain motion about said degree of freedom at said estimated northerly direction; and applying the torque measured in said estimated northerly direction to a predetermined formula to determine north without rotating said spin axis.

23. A method according to claim 22 further comprising the steps of:

azimuthally realigning said gyroscope by an angle determined by said predetermined formula for the torque in said estimated northerly direction;

measuring the torque required to restrain motion about said degree of freedom after realigning said gyroscope; and reapplying the torque measured after realignment to said predetermined formula to redetermine north without rotating said spin axis.

24. A method according to claim 22 further comprising the steps of:

measuring the azimuthal drift rate of said gyroscope when it is not traveling; and calculating the error over time in the azimuthal orientation of said gyroscope based upon the measured drift rate.

25. Apparatus according to claim 9 wherein said control means is operable to provide a bias signal bearing a predetermined linear relationship to the value of said rate signal after said gimbal means is rotated by said calculated angle, said bias signal being a measure of the bias of said central gyro.

26. A method according to claim 19, further comprising the steps of:

measuring the torque required to restrict motion about said degree-of-freedom after azimuthally rotating said spin axis through said calculated angle, the torque measured after rotation through said calculated angle being linearly related to the bias of said gyroscope.

* * * * *